(12) United States Patent
Ahn et al.

(10) Patent No.: US 8,756,268 B2
(45) Date of Patent: Jun. 17, 2014

(54) MONTGOMERY MULTIPLIER HAVING EFFICIENT HARDWARE STRUCTURE

(75) Inventors: Kyoung-moon Ahn, Seoul (KR); Young-sik Kim, Hwaseong-si (KR); Jong-hoon Shin, Hwaseong-si (KR); Sun-soo Shin, Seoul (KR); Ji-su Kang, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 600 days.

(21) Appl. No.: 13/052,524

(22) Filed: Mar. 21, 2011

(65) Prior Publication Data

US 2011/0231467 A1    Sep. 22, 2011

(30) Foreign Application Priority Data

Mar. 19, 2010    (KR) .................. 10-2010-0024760

(51) Int. Cl.
*G06F 7/72*    (2006.01)

(52) U.S. Cl.
USPC ....................................... 708/491

(58) Field of Classification Search
None
See application file for complete search history.

(56) References Cited

U.S. PATENT DOCUMENTS

| | | | | |
|---|---|---|---|---|
| 7,543,011 B2* | 6/2009 | Yoon et al. | | 708/491 |
| 7,552,163 B2* | 6/2009 | Son | | 708/492 |
| 7,805,478 B2* | 9/2010 | Son | | 708/491 |
| 2004/0125948 A1* | 7/2004 | Son | | 380/28 |
| 2004/0215686 A1* | 10/2004 | Yoon et al. | | 708/492 |
| 2004/0225702 A1* | 11/2004 | Son | | 708/492 |
| 2004/0252829 A1* | 12/2004 | Son | | 380/30 |
| 2005/0198093 A1* | 9/2005 | Son | | 708/625 |
| 2011/0231467 A1* | 9/2011 | Ahn et al. | | 708/491 |

FOREIGN PATENT DOCUMENTS

| | | |
|---|---|---|
| KR | 10-2004-0060445 | 7/2004 |
| KR | 10-2004-0092376 | 11/2004 |
| KR | 10-2006-0027896 | 3/2006 |

* cited by examiner

*Primary Examiner* — David H Malzahn
(74) *Attorney, Agent, or Firm* — Stanzione & Kim, LLP

(57) ABSTRACT

A radix-2k Montgomery multiplier including an input coefficient generation unit to receive a multiplier, a multiplicand, a modulus, a sum and a previous sum, to generate and to output a partial product and a multiple modulus by using at least one of the multiplier, the multiplicand, the modulus and the sum, and to divide and to output the received previous sum into units of k bits, an accumulator circuit to receive the partial product, the multiple modulus and k bits of the previous sum from the input coefficient generation unit, and to generate and to output a carry and a sum by summing the partial product, the multiple modulus and the previous sum, and a carry propagation adder (CPA) circuit to generate and to output an ultimate sum by using the carry and the sum.

20 Claims, 11 Drawing Sheets

FIG. 7

| ROW    | 0 | 0 | 1 |   | 0 | 1 |     |
|--------|---|---|---|---|---|---|-----|
| COLUMN | 0 | 1 | 0 |   | 1 | 1 |     |
| PP     |   |   | 0 |   |   |   | SOS |
| MM     |   | 0 |   |   |   | 0 |     |

FIG. 11A

| ROW | | | | 1 | |
| --- | --- | --- | --- | --- | --- |
| COLUMN | | | | 0 | |
| COUNTER | 0 | 1 | 2 | 3 | |
| LOADING | M0 | M1 | M2 | M3 | A0 | A1 | A2 | A3 |
| STATE | CPA | | | | ACC |

FIG. 11B

| ROW | 0 | | 1 | | |
| --- | --- | --- | --- | --- | --- |
| COLUMN | 0 | 1 | 0 | 1 | |
| STATE | ACC | CPA | ACC | CPA |

MONTGOMERY MULTIPLIER HAVING EFFICIENT HARDWARE STRUCTURE

CROSS-REFERENCE TO RELATED APPLICATIONS

This application claims priority under 35 U.S.C. 119(a) from Korean Patent Application No. 10-2010-0024760, filed on Mar. 19, 2010, in the Korean Intellectual Property Office, the disclosure of which is incorporated herein in its entirety by reference.

BACKGROUND

1. Field of the Invention

The present general inventive concept relates to a Montgomery multiplier, and more particularly, to a Montgomery multiplier having an efficient hardware structure.

2. Description of the Related Art

Rivest, Shamir and Adleman (RSA) and elliptic curve cryptography (ECC) algorithms, which are mostly used in public key encryption system, are based on modular multiplication for modular exponentiation. The security of a public key encryption system depends on a key length and the key length has to be increased to increase the security. However, if a key length is increased, the amount of calculations is increased, a circuit is complicated, and thus a critical path is increased. Also, a method of increasing a radix to increase a calculation speed has problems of increasing hardware complexity and a gate count.

SUMMARY

The present general inventive concept provides a Montgomery multiplier to reduce hardware complexity and a gate count. In particular, the present general inventive concept may provide a Montgomery multiplier having an accumulator circuit without an additional non-shift circuit. The present general inventive concept may also provide a Montgomery multiplier having a carry propagation adder (CPA) circuit that may receive a sum from an input coefficient generation unit instead of an accumulator circuit, and thus may not include a register to save the sum S. The Montgomery multiplier of the present general inventive concept may load a previous sum SI in units having a predetermined number of bits instead of loading all bits at once, so that a size of a previous sum register to save the previous sum SI may be reduced.

Additional features and utilities of the present general inventive concept will be set forth in part in the description which follows and, in part, will be obvious from the description, or may be learned by practice of the present general inventive concept.

Exemplary embodiments of the present general inventive concept provides a radix-$2^k$ Montgomery multiplier including an input coefficient generation unit to receive a multiplier, a multiplicand, a modulus, a sum and a previous sum, to generate and to output a partial product and a multiple modulus by using at least one of the multiplier, the multiplicand, the modulus and the sum, and to divide and to output the received previous sum into units of k bits, an accumulator circuit to receive the partial product, the multiple modulus and k bits of the previous sum from the input coefficient generation unit, and to generate and to output a carry and the sum by summing the partial product, the multiple modulus and the previous sum, and a carry propagation adder (CPA) circuit to generate and to output an ultimate sum by using the carry and the sum.

The input coefficient generation unit may include a partial product generation unit to generate the partial product according to the multiplier and the multiplicand, a multiple modulus generation unit to generate the multiple modulus according to k lower bits of the sum and the modulus, and a previous sum generation unit to divide and to output the received previous sum into units of k bits.

The previous sum generation unit may include a previous sum register to save the received previous sum, and a size of the previous sum register may be identical to k bits or a bit-width of a bus to transmit the previous sum to the previous sum generation unit.

The accumulator circuit may include a plurality of adders, each of the plurality of adders may receive corresponding bits of the partial product and the multiple modulus, each of adders corresponding to k lower bits from among the plurality of adders may receive k bits of the previous sum, and sums output from the plurality of adders may be shifted by k bits so as to be input to the plurality of adders, and carries output from the plurality of adders may be shifted by k−1 bits so as to be input to the plurality of adders.

The input coefficient generation unit may output the partial product one clock earlier than the multiple modulus, and may output an extended sign of the received previous sum instead of the partial product when the previous sum generation unit outputs a sign of the received previous sum.

The accumulator circuit may include a plurality of CPA units, each of the plurality of CPA units may receive corresponding k bits of the partial product and the multiple modulus, a first CPA unit may further receive k bits of the previous sum, and a sum output from an $m^{th}$ CPA unit, with m being a natural number greater than or equal to 2, may be shifted and input to an (m−1)th CPA unit, and a carry output from the $m^{th}$ CPA unit may be input to the $m^{th}$ CPA unit.

The accumulator circuit may include a plurality of carry registers corresponding to the plurality of CPA units, and a plurality of sum registers corresponding to the plurality of CPA units, and each of the plurality of carry registers may have a size of 1 bit, and each of the plurality of sum registers may have a size of k bits.

The first CPA unit may include a plurality of adders, each of the plurality of adders may receive corresponding bits of the partial product, the multiple modulus, k bits of the previous sum, and a sum received from the second CPA unit, carries generated by the plurality of adders other than a last adder may be output to subsequent adders, and a carry generated by the last adder may be stored in a carry register corresponding to the first CPA unit.

The input coefficient generation unit may include a plurality of registers (e.g., X registers) to load and to save the multiplier and the modulus from an external device, and the sum generated by the accumulator circuit may be output to the input coefficient generation unit and may be stored in one of the plurality of registers (e.g., in one of the X registers).

The input coefficient generation unit may load one of the multiplier and the modulus and may load the other of the multiplier and the modulus, and, when the one of the multiplier and the modulus is loaded, the input coefficient generation unit may save the sum output from the accumulator circuit, in one of the plurality of registers (e.g., an X register) corresponding to the other of the multiplier and the modulus.

The CPA circuit may receive the sum from one of the plurality of registers (e.g., one of the X registers), may receive the carry from the accumulator circuit, and may generate and output the ultimate sum by using the carry and the sum, and the accumulator circuit may operate when the CPA circuit operates.

Exemplary embodiments of the present general inventive concept may also provide a radix-$2^k$ Montgomery multiplier including an input coefficient generation unit to receive a multiplier, a multiplicand, a modulus and a sum, and to generate and to output a partial product and a multiple modulus by using at least one of the multiplier, the multiplicand, the modulus and the sum, an accumulator circuit to receive the partial product and the multiple modulus from the input coefficient generation unit, and to generate and to output a carry and a sum by summing the partial product and the multiple modulus, and a carry propagation adder (CPA) circuit to generate and to output an Ultimate sum by using the carry and the sum.

The accumulator circuit may include a plurality of CPA units, each of the plurality of CPA units may receive corresponding k bits of the partial product and the multiple modulus, a sum output from an $m^{th}$ CPA unit, with m being a natural number greater than or equal to 2, may be shifted and input to an (m−1)th CPA unit, and a carry output from the $m^{th}$ CPA unit may be input to the $m^{th}$ CPA unit, and each of the plurality of CPA units may generate a 1-bit carry and a k-bit sum by summing received data.

The accumulator circuit may include a plurality of carry registers corresponding to the plurality of CPA units, and a plurality of sum registers corresponding to the plurality of CPA units, and each of the plurality of carry registers may have a size of 1 bit, and each of the plurality of sum registers may have a size of k bits.

Each of the plurality of CPA units may include a plurality of adders, each of the plurality of adders may receive corresponding bits of the partial product, the multiple modulus, and a sum received from a subsequent CPA unit, carries generated by the plurality of adders other than a last adder may be output to subsequent adders, and a carry generated by the last adder may be stored in a corresponding carry register.

The input coefficient generation unit may include a plurality of registers (e.g., X registers) to load and to save the multiplier and the modulus from an external device, and the sum generated by the accumulator circuit may be output to the input coefficient generation unit and may be stored in one of the X registers.

The input coefficient generation unit may load one of the multiplier and the modulus and may load the other of the multiplier and the modulus, and, when the one of the multiplier and the modulus is loaded, the input coefficient generation unit may save the sum output from the accumulator circuit, in an X register corresponding to the other of the multiplier and the modulus.

The CPA circuit may receive the sum from one of the X registers, may receive the carry from the accumulator circuit, and may generate and output the ultimate sum by using the carry and the sum, and the accumulator circuit may operate while the CPA circuit operates.

Exemplary embodiments of the present general inventive concept may also provide an encryption/decryption apparatus including a radix-$2^k$ Montgomery multiplier that includes an input coefficient generation unit to receive a multiplier, a multiplicand, a modulus, a sum and a previous sum, to generate and to output a partial product and a multiple modulus by using at least one of the multiplier, the multiplicand, the modulus and the sum, and to divide and to output the received previous sum into units of k bits, an accumulator circuit to receive the partial product, the multiple modulus and k bits of the previous sum from the input coefficient generation unit, and to generate and to output a carry and the sum by summing the partial product, the multiple modulus and the previous sum, and a carry propagation adder (CPA) circuit to generate and to output an ultimate sum by using the carry and the sum.

Exemplary embodiments of the present general inventive concept may also provide a method of operating a radix-2k Montgomery multiplier, the method including receiving a multiplier, a multiplicand, a modulus, a sum, and a previous sum with an input coefficient generation apparatus of the radix-2k Montgomery multiplier, generating a partial product and a multiple modulus with at least one of the multiplier, the multiplicand, the modulus, and the sum with the input coefficient generation apparatus, dividing the received previous sum into units of k bits with the input coefficient generation apparatus, generating a carry and the sum by summing the partial product, the multiple modulus and the previous sum with an accumulator of the radix-2k Montgomery multiplier, and generating and outputting an ultimate sum by using the carry and the sum with a carry propagation adder (CPA) of the radix-2k Montgomery multiplier.

The method may include where the Montgomery multiplier loads the previous sum in the divided k bit units.

The method may include where the accumulator reflects the sign of the previous sum.

The method may include where the CPA receives the sum from the input coefficient generation apparatus instead of the accumulator.

Exemplary embodiments of the present general inventive concept may also provide a method of operating a radix-2k Montgomery multiplier, the method including generating a partial product and a multiple modulus by using at least one of a received multiplier, a multiplicand, a modulus and a sum with an input coefficient generation apparatus of the radix-2k Montgomery multiplier, generating a carry and the sum by summing the partial product and the multiple modulus with an accumulator of the radix-2k Montgomery multiplier, and generating and outputting an ultimate sum with a carry propagation adder (CPA) of the radix-2k Montgomery multiplier by using the carry and the sum.

The method may include where the Montgomery multiplier loads the previous sum in the divided k bit units.

The method may include where the accumulator reflects the sign of the previous sum.

The method may include where the CPA receives the sum from the input coefficient generation apparatus instead of the accumulator.

Exemplary embodiments of the present general inventive concept may also provide a radix-2k Montgomery multiplier including an input coefficient generation unit to generate a partial product and a multiple modulus, and to divide a received previous sum into units of k bits, an accumulator to sum the partial product, the multiple modulus and the previous sum so as to generate a carry and a sum, and a carry propagation adder (CPA) to generate an ultimate sum by using the carry and the sum.

The radix-2k Montgomery multiplier may also include where the accumulator is without a non-shift circuit.

BRIEF DESCRIPTION OF THE DRAWINGS

The above and/or other features and utilities of the present general inventive concept will become apparent and more readily appreciated from the following description of the exemplary embodiments, taken in conjunction with the accompanying drawings, in which:

FIG. 7 illustrates a point of time to process a sign of a previous sum when the Montgomery multiplier illustrated in FIG. 3 operates using double precision, according to exemplary embodiments of the present general inventive concept;

FIGS. 11A and 11B illustrate a method of loading a multiplier and a modulus in the Montgomery multiplier illustrated in FIG. 10, according to exemplary embodiments of the present general inventive concept.

DETAILED DESCRIPTION OF THE EMBODIMENTS

Figure 1:
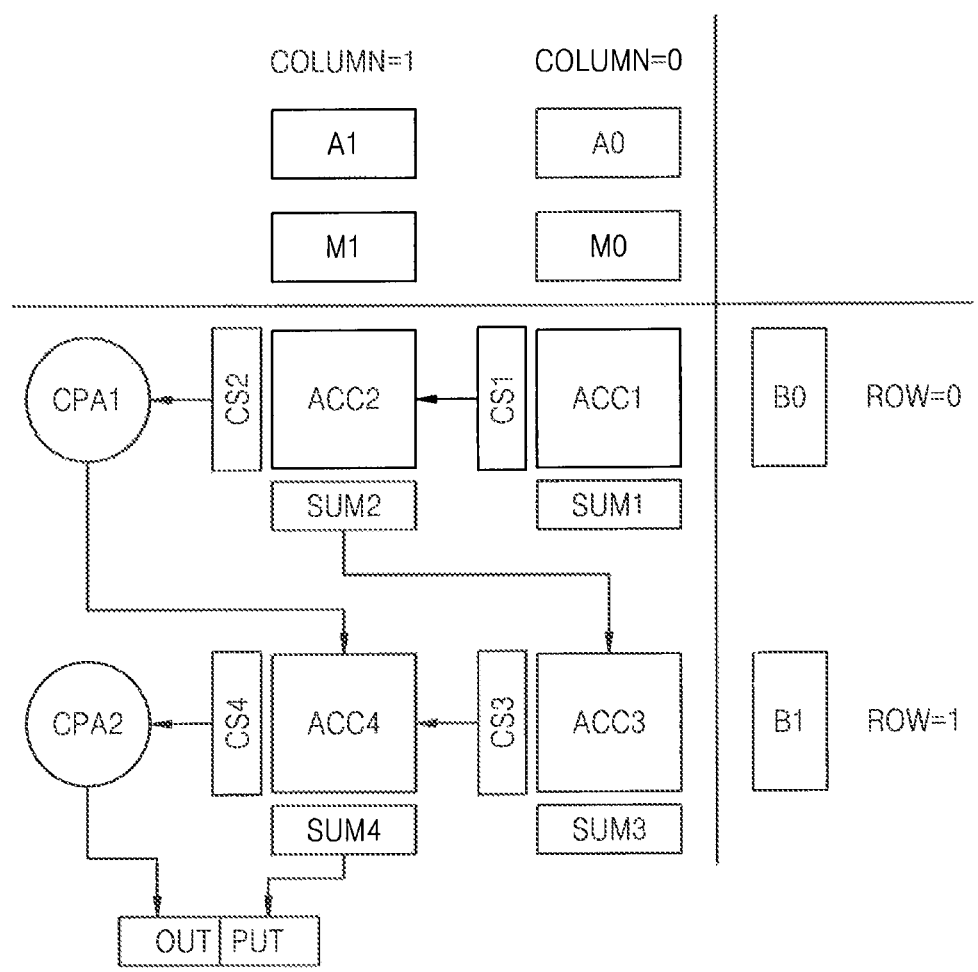
FIG. 1 illustrates the concept of precision used in a Montgomery multiplier, according to exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, the present general inventive concept will be described in detail by explaining embodiments of the inventive concept with reference to the attached drawings. Like reference numerals denote like elements in the drawings.

A general Montgomery multiplication algorithm will be described as a background of the present general inventive concept.

The Montgomery multiplication algorithm is known as an algorithm that most efficiently performs modular multiplication. In the Montgomery multiplication algorithm, modular multiplication is performed by repeatedly performing processes of summing a sum generated in a previous loop calculation, a partial product (PP), and a multiple modulus (MM), and then shifting them.

In the Montgomery multiplication algorithm, a multiplier A, a multiplicand B, and a modulus M are input, and an ultimate sum $S_n$ is calculated and output. Correlations between the ultimate sum $S_n$, and the multiplier A, the multiplicand B and the modulus M are as represented in Equation 1.

$$S_n = AB2^{-r} \bmod M \quad \text{[Equation 1]}$$

Here, the multiplier A, the multiplicand B, the modulus M and a number r of bits of the modulus M have correlations as represented in Equations 2 through 4.

$$2^{r-1} < M < 2^r, M \text{ is odd} \quad \text{[Equation 2]}$$

$$-M < A, B < M \quad \text{[Equation 3]}$$

$$B = \sum_{i=0}^{n-1} B_i 2^{ki} \; (B_i \in \{0, 1, \ldots, 2^k - 1\}) \quad \text{[Equation 4]}$$

In the above condition, the Montgomery multiplication algorithm is as described below.

---
1. $S_0 = 0$
2. For i = 1 to n
   A. $Q_i = (-1/M) \times (S_{i-1} + B_i A) \bmod 2^k$
   B. $S_i = (S_{i-1} + B_i A + Q_i M)/2^k$
3. If $S_n < 0$ then $S_n = S_n + M$
---

The above Montgomery multiplication algorithm is a radix-$2^k$ Montgomery multiplication algorithm, and a radix of the Montgomery multiplication algorithm may be variously set according to a value k. In the Montgomery multiplication algorithm, $B_i A$ may correspond to the partial product PP and $Q_i M$ may correspond to the multiple modulus MM.

FIG. 1 illustrates the concept of precision used in a Montgomery multiplier, according to exemplary embodiments of the present general inventive concept.

When a Montgomery multiplication algorithm is performed, the concept of precision is adopted to use the same hardware apparatus regardless of the number of bits of a multiplier A, a multiplicand B, and a modulus M. The precision indicates a method of dividing an input multiplier A, a multiplicand B, and a modulus M, and calculating the multiplier A, the multiplicand B and the modulus M having a predetermined number of bits (e.g., a large number of bits) by using a hardware calculation apparatus of a predetermined size and complexity (e.g., small-sized hardware).

FIG. 1 illustrates a Montgomery multiplication algorithm using double precision to divide the multiplier A, the multiplicand B, and the modulus M into {A1, A0}, (B1, B0) and {M1, M0}. However, a Montgomery multiplier according to exemplary embodiments of the present general inventive concept is not limited to double precision, and may also use any type of multiple precision (e.g., triple precision, quadruple precision, etc.) or may use single precision.

A Montgomery multiplication algorithm using double precision will now be described with reference to FIG. 1. Referring to FIG. 1, first through fourth accumulation stages ACC1 through ACC4 (e.g., ACC1, ACC2, ACC3, and ACC4) may be performed by an accumulator circuit included in a Montgomery multiplier according to exemplary embodiments of the present general inventive concept. Also, first and second carry propagation adding stages CPA1 and CPA2 may be performed by a carry propagation adder (CPA) circuit included in a Montgomery multiplier according to exemplary embodiments of the present general inventive concept. The accumulator circuit and the CPA circuit will be described later with reference to FIG. 3.

The accumulator circuit may receive the multiplier A0, the multiplicand B0 and the modulus M0, and may perform the first accumulation stage ACC1. The first accumulation stage ACC1 may be an accumulation stage when a row ROW has a value 0 and a column COLUMN has a value 0. A reduction value SUM1 generated by the first accumulation stage ACC1 can be ignored according to the Montgomery multiplication algorithm, and a carry and sum CS1 generated by performing the first accumulation stage ACC1 may be input to the accumulator circuit in the second accumulation stage ACC2.

The accumulator circuit may receive the multiplier A1, the multiplicand B0, the modulus M1 and the carry and sum CS1 generated in the first accumulation stage ACC1, and may perform the second accumulation stage ACC2. The second accumulation stage ACC2 may be an accumulation stage when the row ROW has a value 0 and the column COLUMN has a value 1. A reduction value SUM2 generated by performing the second accumulation stage ACC2 may be input to the accumulator circuit in the third accumulation stage ACC3 as a previous sum SI. Also, a carry and sum CS2 generated by performing the second accumulation stage ACC2 may be input to the CPA circuit to perform the first carry propagation adding stage CPA1.

The accumulator circuit may receive the multiplier A0, the multiplicand B1, the modulus M0 and the reduction value SUM2 generated in the second accumulation stage ACC2 (e.g., when a row ROW has a value 0 and a column COLUMN has a value 1), and may perform the third accumulation stage ACC3. The third accumulation stage ACC3 may be an accumulation stage when the row ROW has a value 1 and the column COLUMN has a value 0. A reduction value SUM3 generated by the third accumulation stage ACC3 can be ignored according to the Montgomery multiplication algorithm, and a carry and sum CS3 generated by performing the third accumulation stage ACC3 may be input to the accumulator circuit in the fourth accumulation stage ACC4.

The accumulator circuit may receive the multiplier A1, the multiplicand B1, the modulus M1, the carry and sum CS3 generated in the third accumulation stage ACC3 and a resultant value of the first carry propagation adding stage CPA1, and may perform the fourth accumulation stage ACC4. The fourth accumulation stage ACC4 may be an accumulation stage when the row ROW has a value 1 and the column COLUMN has a value 1. A carry and sum CS4 generated by performing the fourth accumulation stage ACC4 may be input to the CPA circuit to perform the second carry propagation adding stage CPA2.

An ultimate sum OUTPUT may be generated by connecting a resultant value of the second carry propagation adding stage CPA2 to a reduction value SUM4 generated by performing the fourth accumulation stage ACC4. The ultimate sum OUTPUT in FIG. 1 may correspond to the ultimate sum $S_n$ of the Montgomery multiplication algorithm.

Figure 2:
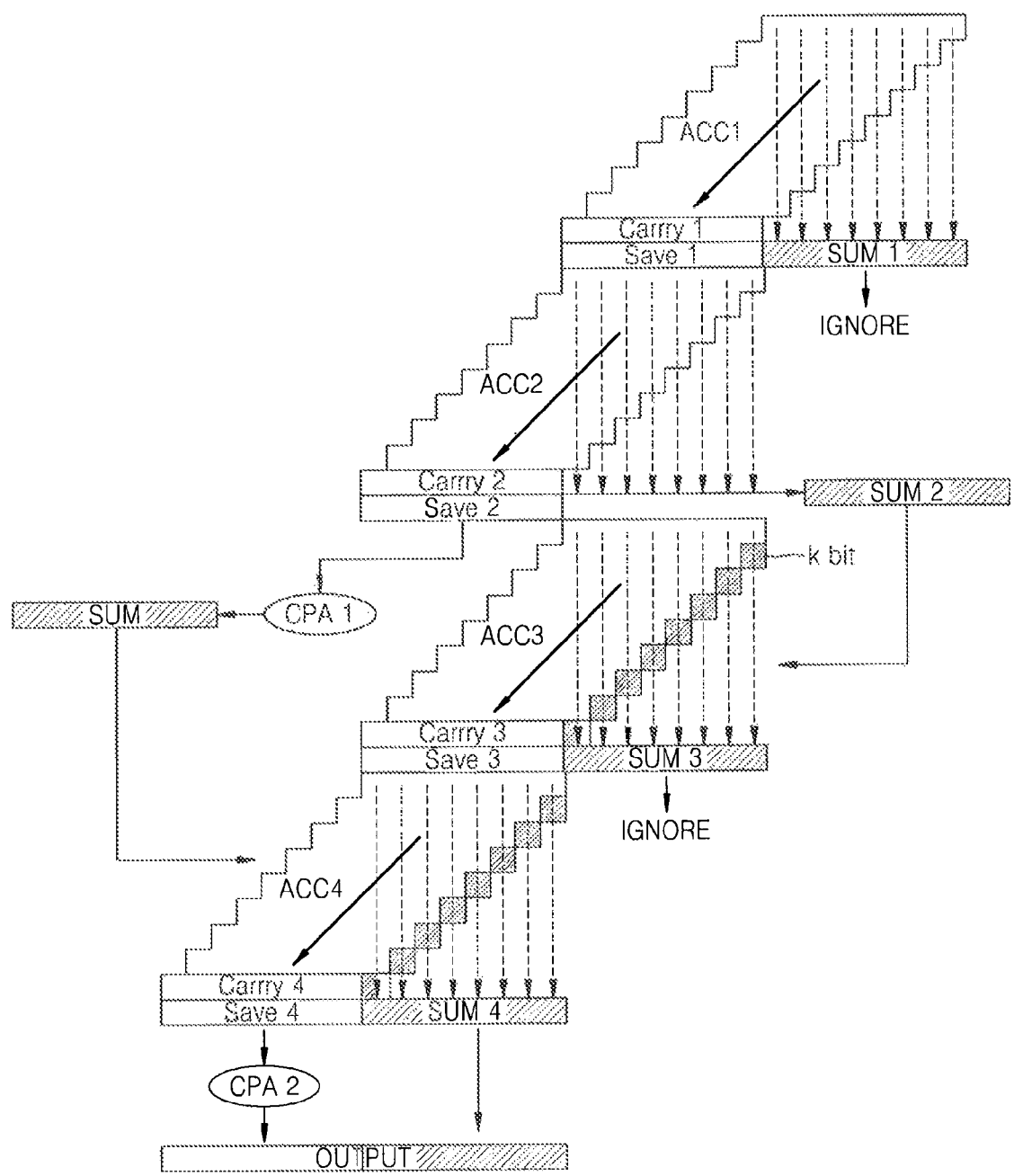
FIG. 2 illustrates a calculation operation to process a previous sum in units of k bits in a Montgomery multiplier, according to exemplary embodiments of the present general inventive concept.

FIG. 2 is a diagram illustrating a calculation operation for processing a previous sum SI in units of k bits in a Montgomery multiplier, according to exemplary embodiments of the present general inventive concept.

In general, a reduction value SUM2 generated in a second accumulation stage ACC2 is summed when a third accumulation stage ACC3 is started. Accordingly, a typical accumulator circuit requires an additional non-shift circuit, and thus the size of hardware is increased, and a gate count and power consumption are increased.

However, referring to FIG. 2, in the Montgomery multiplier according to exemplary embodiments of the present general inventive concept, as the previous sum SI, the reduction value SUM2 generated in the second accumulation stage ACC2 may be input to the accumulator circuit in units of k bits when the third accumulation stage ACC3 is performed. As such, the accumulator circuit may not include an additional non-shift circuit, and thus gate count and power consumption of the Montgomery multiplier may be reduced. Here, k is a value to be determined according to radix-$2^k$, and may refer to the number of bits to be shifted at every clock of the accumulator circuit.

The Montgomery multiplier according to exemplary embodiments of the present general inventive concept may simultaneously perform the first carry propagation adding stage CPA1 and the third accumulation stage ACC3. This will be described below with reference to FIGS. 10, 11A, and 11B.

Figure 3:
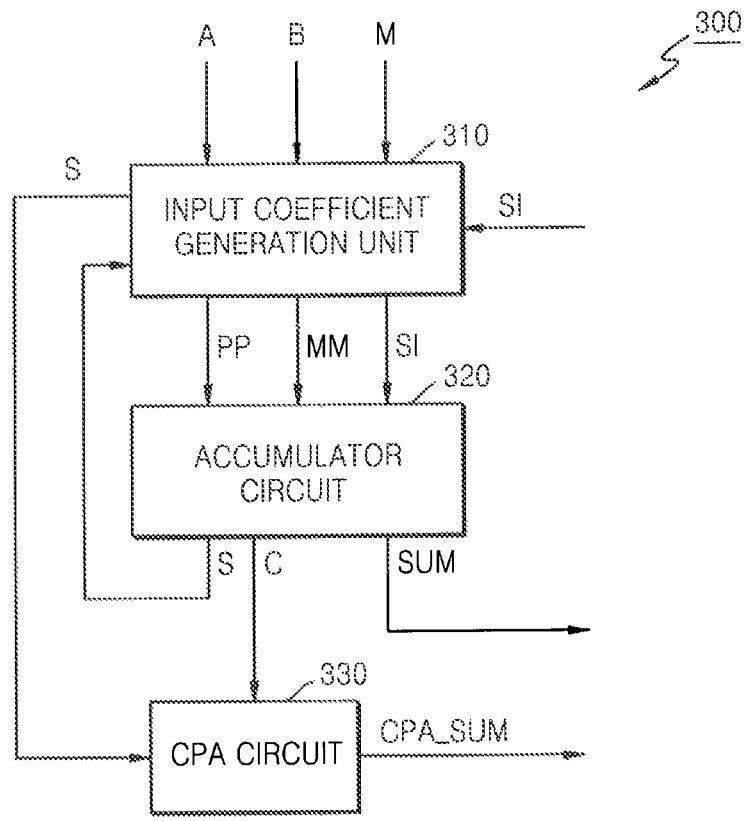
FIG. 3 illustrates a block diagram of a Montgomery multiplier according to exemplary embodiments of the present general inventive concept.

FIG. 3 is a block diagram of a Montgomery multiplier 300 according to exemplary embodiments of the present general inventive concept. Referring to FIG. 3, the Montgomery multiplier 300 may include an input coefficient generation unit 310, an accumulator circuit 320 and a CPA circuit 330. The Montgomery multiplier 300 may be a processor, an integrated circuit, a programmable logic device, a field programmable gate array, application specific integrated circuit, or any other suitable circuit to carry out the exemplary embodiments of the present general inventive concept disclosed herein.

The input coefficient generation unit 310 may receive a multiplier A, a multiplicand B, a modulus M, and a previous sum SI from an external device. The input coefficient generation unit 310 may receive a sum S from the accumulator circuit 320. The input coefficient generation unit 310 may generate a partial product PP and a multiple modulus MM by using the multiplier A, the multiplicand B, the modulus M, and the sum S, and may output the partial product PP and the multiple modulus MM to the accumulator circuit 320. The input coefficient generation unit 310 may divide the previous sum SI into units of k bits and may output the previous sum SI to the accumulator circuit 320 in units of k bits.

As described above in connection with FIG. 1, the Montgomery multiplier 300 may receive the multiplier A, the multiplicand B, and the modulus M, which may use any precision to carry out the exemplary embodiments of the present general inventive concept disclosed herein (e.g., single precision, double precision, triple precision, quadruple precision, etc.). That is, for example, if double precision is used as illustrated in FIG. 1, the input coefficient generation unit 310 may receive a multiplier A0, a multiplicand B0 and a modulus M0 in a first accumulation stage ACC1. Likewise, the input coefficient generation unit 310 may also receive the multiplier A, the multiplicand B, and the modulus M, which use double precision, in second through fourth accumulation stages ACC2 through ACC4. Hereinafter, the concept of precision may be applied to the multiplier A, the multiplicand B, and the modulus M.

The accumulator circuit 320 may receive the partial product PP, the multiple modulus MM, and the previous sum SI from the input coefficient generation unit 310. The accumulator circuit 320 may repeatedly perform an accumulating/shifting operation on the partial product PP, the multiple modulus MM, and the previous sum SI. The accumulating/shifting operation of the accumulator circuit 320 can be performed using a general Montgomery multiplication algorithm, which is well-known to one of ordinary skill in the art, and thus will not be described in detail here.

The accumulator circuit 320 may output k bits of a reduction value SUM at every clock when in an accumulation stage in which a column COLUMN does not have a value 0, e.g., the second and fourth accumulation stages ACC2 and ACC4 in FIG. 1. The accumulator circuit 320 may output a carry C and a sum S at a last clock of a row ROW. That is, the accumulator circuit 320 may output the carry C and the sum S at a last clock of each of the second and fourth accumulation stages ACC2 and ACC4.

The CPA circuit 330 may receive the carry C and the sum S, which can be carry save adder (CSA)-type outputs, and may generate and output a CPA-type resultant value CPA_SUM. The CPA circuit 330 can be a general element and/or circuit to be included in the Montgomery multiplier 300, which has a structure and operation well-known to one of ordinary skill in the art, and thus will not be described in detail here. However, the CPA circuit 330 of the Montgomery multiplier 300 may receive the sum S from the input coefficient generation unit 310 instead of the accumulator circuit 320, and thus may not include a register to save the sum S. Characteristics of the CPA circuit 330 of the Montgomery multiplier 300 will be described in detail later with reference to FIGS. 10, 11A, and 11B.

According to a Montgomery multiplication algorithm, the accumulator circuit 320 may perform an accumulating/shifting operation and output k bits of the reduction value SUM at every clock when in an accumulation stage in which the column COLUMN does not have a value 0, e.g., the second and fourth accumulation stages ACC2 and ACC4 in FIG. 1.

The CPA circuit 330 can generate the resultant value CPA_SUM by using an output of the accumulator circuit 320. The reduction value SUM and the resultant value CPA_SUM may be saved in an external storage device such as a memory (e.g., a semiconductor memory device, a Random Access Memory, a digital storage device such as a hard disk drive and/or solid state drive, a flash memory, and/or any suitable memory device to carry out the exemplary embodiments of the present general inventive concept), and the reduction value SUM and the resultant value CPA_SUM may be used as the previous sum SI. The previous sum SI input to the input coefficient generation unit 310 can be input in units of k bits, and thus the previous sum SI saved in the external storage device may not be entirely read at once. The input coefficient generation unit 310 may read the previous sum SI in units of a bit-width of a bus at once and may use the previous sum SI in units of k bits.

A conventional Montgomery multiplier loads all bits of the previous sum SI from an external device at once and thus requires a register having the same size as the previous sum SI. However, as the Montgomery multiplier 300 may load the previous sum SI in units of a plurality of bits (e.g., units having a predetermined number of bits) instead of loading all bits at once, the size of a previous sum register for saving the previous sum SI may be reduced. Also, as the size of the previous sum register is controlled, the Montgomery multiplier 300 may have the same number of memory accesses as a conventional Montgomery multiplier.

Figure 4:
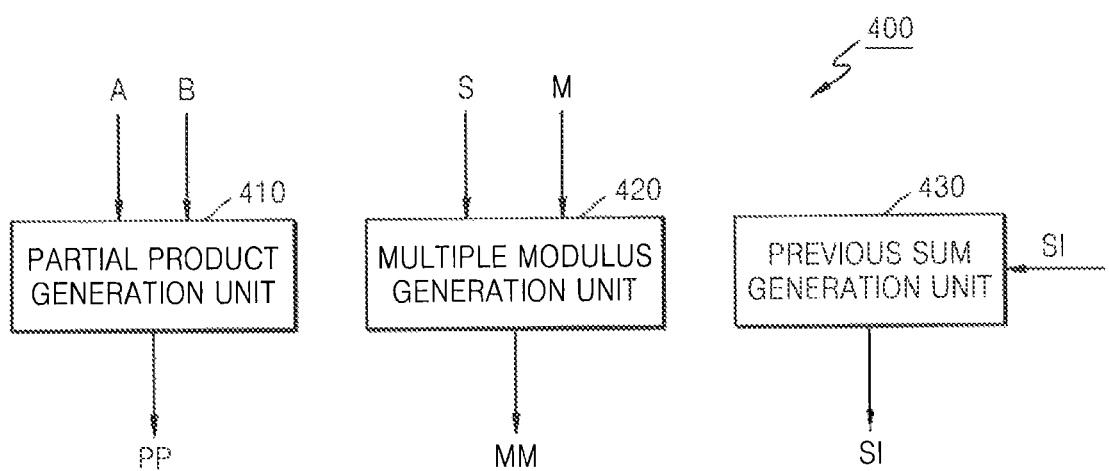
FIG. 4 is a block diagram illustrating an input coefficient generation unit included in the Montgomery multiplier illustrated in FIG. 3, according to exemplary embodiments of the present general inventive concept.

FIG. 4 is a block diagram of an input coefficient generation unit 400 included in the Montgomery multiplier 300 illustrated in FIG. 3, according to exemplary embodiments of the present general inventive concept. The input coefficient generation unit 400 illustrated in FIG. 4 may correspond to the input coefficient generation unit 310 illustrated in FIG. 3.

Referring to FIG. 4, the input coefficient generation unit 400 may include a partial product generation unit 410, a multiple modulus generation unit 420, and a previous sum generation unit 430. The input coefficient generation unit 400, including input coefficient generation unit 400 may include a partial product generation unit 410, a multiple modulus generation unit 420 and a previous sum generation unit 430, may be an integrated circuit, a processor, a programmable logic device, a field programmable gate array, an application specific integrated circuit, and/or any suitable device to carry out the exemplary embodiments of the present general inventive concept.

The partial product generation unit 410 may receive a multiplier A and a multiplicand B, may generate a partial product PP by using the multiplier A and the multiplicand B, and may output the partial product PP to the accumulator circuit 320. As described above in the description of the Montgomery multiplication algorithm, the partial product PP output from the partial product generation unit 410 may be BA, where B, may be calculated by using Equation 4. The partial product generation unit 410 can have an operation and structure well-known to one of ordinary skill in the art and thus will not be described in detail here.

The multiple modulus generation unit 420 may receive the modulus M and k lower bits of the sum S, and may generate a multiple modulus MM by using the modulus M and the k lower bits of the sum S. As described above in the description of the Montgomery multiplication algorithm, the multiple modulus MM may be $Q_iM_i$ where $Q_i$ may be calculated by using the modulus M and the k lower bits of the sum S. The multiple modulus generation unit 420 can have an operation and structure well-known to one of ordinary skill in the art and thus will not be described in detail here.

The partial product generation unit 410 and the multiple modulus generation unit 420 may generate a plurality of outputs and the number of inputs of the accumulator circuit 320 may be, accordingly, variable.

The previous sum generation unit 430 may receive a previous sum SI from an external device (e.g., a host device, a semiconductor memory device, a Random Access Memory, a digital storage device such as a hard disk drive and/or solid state drive, a flash memory, and/or any external device to carry out the exemplary embodiments of the present general inventive concept). As described above in connection with FIG. 3, the previous sum generation unit 430 may receive the previous sum SI from the external device in units of certain bits instead of receiving all bits at once and may output the previous sum SI in units of k bits.

The previous sum generation unit 430 may output the previous sum SI saved in an internal previous sum register, to the accumulator circuit 320 in units of k bits. Whenever the accumulator circuit 320 performs an accumulating/shifting operation, the previous sum generation unit 430 may output k bits of the previous sum SI to the accumulator circuit 320.

As in a case when the row ROW has a value 0 in FIG. 1, in an accumulation stage in which the previous sum SI does not exist, the previous sum generation unit 430 may output a value 0 as the previous sum SI.

Figure 5:
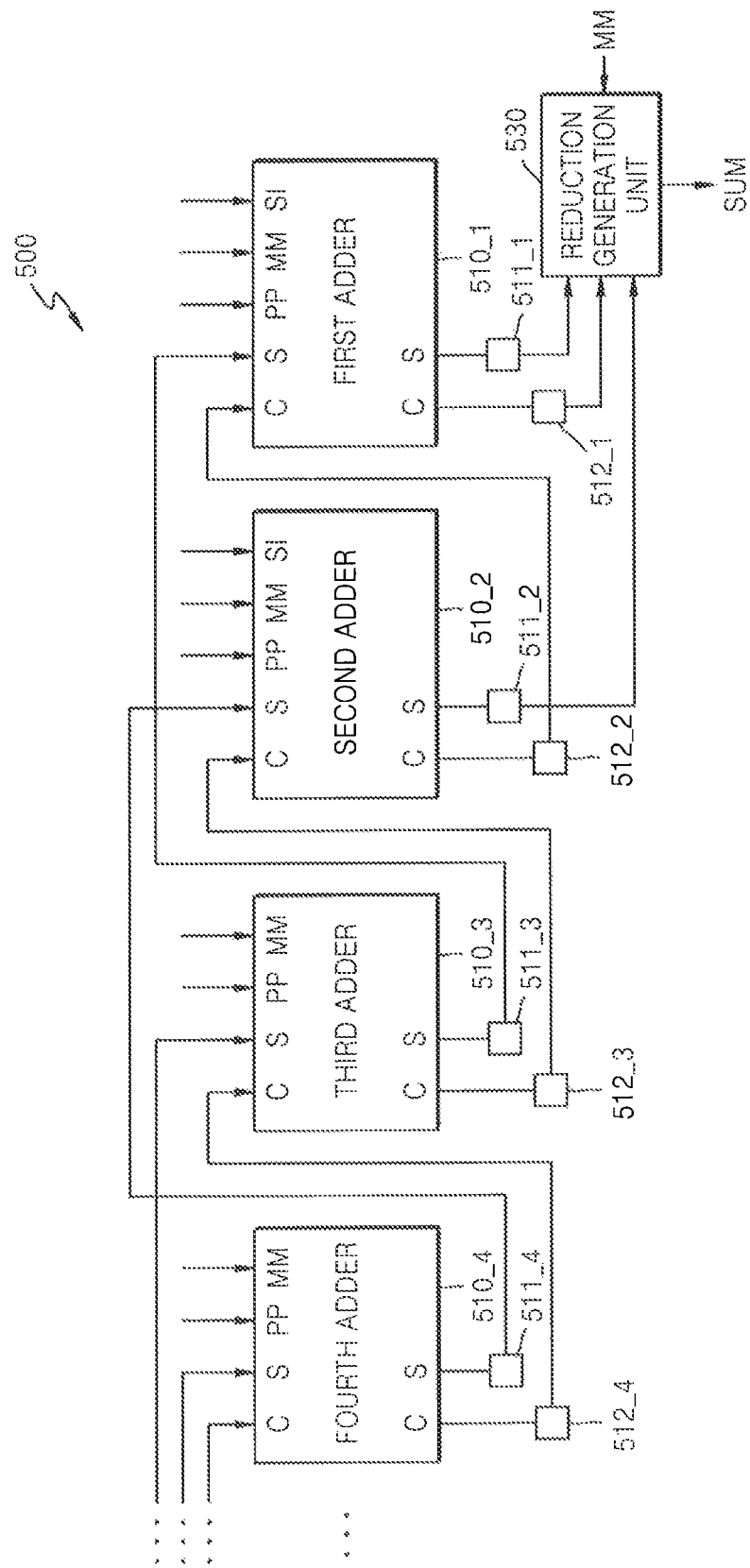
FIG. 5 is a block diagram illustrating an accumulator circuit included in the Montgomery multiplier illustrated in FIG. 3, according to exemplary embodiments of the present general inventive concept.

FIG. 5 is a block diagram of an accumulator circuit 500 included in the Montgomery multiplier 300 illustrated in FIG. 3, according to exemplary embodiments of the present general inventive concept. The accumulator circuit 500 may correspond to the accumulator circuit 320 illustrated in FIG. 3.

Referring to FIG. 5, the accumulator circuit 500 may include first through fourth adders 510_1 through 510_4 (i.e., first adder 510_1, second adder 510_2, third adder 510_3, and fourth adder 510_4), and a reduction generation unit 530. The accumulator circuit 500 may include first through fourth sum registers 511_1 through 511_4 (e.g., first sum register 511_1, second sum register 511_2, third sum register 511_3, and fourth sum register 511_4) to respectively save sums S output from the first through fourth adders 510_1 through 510_4, and first through fourth carry registers 512_1 through 512_4 (i.e., first carry register, 512_1, second carry register 512_2, third carry register 512_3, and fourth carry register 512_4) to respectively save carries C output from the first through fourth adders 510_1 through 510_4.

The first adder 510_1, the second adder 510_2, the third adder 510_3, and the fourth adder 510_4 may each receive a carry C, a sum S, a partial product PP, and a multiple modulus MM. Each of the first and second adders 510_1 and 510_2 may further receive a previous sum SI. Each of the first through fourth adders 510_1 through 510_4 may respectively sum input data and may respectively generate a carry C and a sum S. Each bit of the partial product PP and the multiple modulus MM may be input to the corresponding one of the first through fourth adders 510_1 through 510_4, respectively.

Although four adders, i.e., the first through fourth adders 510_1 through 510_4, are illustrated in FIG. 5, the number of adders is not limited to four and the accumulator circuit 500 may include a different number of adders (e.g., two adders, four adders, six adders, eight adders, etc.).

As illustrated in FIG. 5, the sum S and the carry C output from the third adder 510_3 can be respectively input to the first and second adders 510_1 and 510_2. Accordingly, when the accumulator circuit 500 performs an accumulating/shifting operation, the sums S and the carries C output at a previous clock can be respectively shifted by 2 bits and 1 bit at a subsequent clock so as to be input to the first through fourth adders 510_1 through 510_4. Accordingly, the accumulator circuit 500 can perform a radix-4 ($2^k$, k=2) Montgomery multiplication algorithm. However, the accumulator circuit 500 is exemplarily illustrated in FIG. 5 and the Montgomery multiplier 300 may perform a Montgomery multiplication algorithm with respect to various values of k and various radices.

When k has a value 2, the previous sum SI output from the previous sum generation unit 430 may have 2 bits, and a least significant bit (LSB) and a most significant bit (MSB) of the previous sum SI can be respectively input to the first and second adders 510_1 and 510_2. That is, as described above, unlike the third and fourth adders 510_3 and 510_4, the first and second adders 510_1 and 510_2 may receive the previous sum SI.

The accumulator circuit 500 can receive 2 bits of the previous sum SI at every clock, can repeatedly perform an accumulating/shifting operation, and thus may sum all bits of the previous sum SI. The Montgomery multiplier 300 may sum a reduction value SUM2 in units of k bits in the third accumulation stage ACC3 illustrated in FIG. 2.

The reduction generation unit 530 may receive the carry C and the sum S from the first adder 510_1, may receive the sum S from the second adder 510_2, and may receive k lower bits of the multiple modulus MM. The reduction generation unit 530 may sum the received carry C, the sums S and the k lower bits of the multiple modulus MM, and may generate and output a reduction value SUM. The reduction generation unit 530 may have a structure and operation well-known to one of ordinary skill in the art and thus will not be described in detail here.

FIGS. 6A through 6F are diagrams illustrating a method of processing a sign SOS of a previous sum SI in the Montgomery multiplier 300 illustrated in FIG. 3, according to exemplary embodiments of the present general inventive concept.

As described above in relation to FIGS. 3 through 5, the Montgomery multiplier 300 processes the previous sum SI in units of k bits instead of processing all bits at once, and thus a problem may occur in processing the sign SOS of the previous sum SI. That is, in FIG. 3, the input coefficient generation unit 310 may not reflect the sign SOS of the previous sum SI when the previous sum SI generated in a previous calculation is output to the accumulator circuit 320 in units of k bits. The sign SOS of the previous sum SI can be reflected to perform accurate calculations. That is, the sign SOS of the previous sum SI can be used by the Montgomery multiplier of the present general inventive concept.

The Montgomery multiplier 300 may reflect the sign SOS of the previous sum SI by using the partial product generation unit 410.

In a Montgomery multiplication algorithm, a multiple modulus MM is determined based on a carry C, a sum S, and a partial product PP, and thus the multiple modulus MM may be generated one clock later than the partial product PP to reduce a critical path. Accordingly, the partial product PP may be generated one clock earlier than the multiple modulus MM and thus, when the Montgomery multiplication algorithm is performed, the partial product PP at a last clock of a row ROW may have a value 0. As such, in the Montgomery multiplier 300, the partial product generation unit 410 may output the sign SOS of the previous sum SI instead of a value 0 as the partial product PP at the last clock of the row ROW. In this manner, the Montgomery multiplier 300 may reflect the sign SOS of the previous sum SI.

A method of processing the sign SOS of the previous sum SI in the Montgomery multiplier 300 will now be described. In FIG. 6, the letter "S" (e.g., the letter "S" in the boxes illustrated in FIGS. 6A-6F) refers to a sign of a corresponding variable, and sign extension may be applied to "S".

Figure 6A:
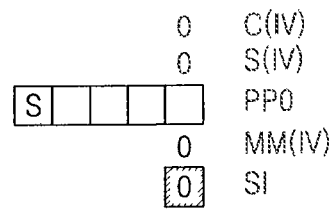
FIGS. 6A through 6F illustrate a method of processing a sign of a previous sum in the Montgomery multiplier illustrated in FIG. 3, according to exemplary embodiments of the present general inventive concept.

In FIG. 6A, the carry C, the sum S and the multiple modulus MM may be input as initial values IVs. Since the partial product PP may be generated one clock earlier than the multiple modulus MM as described above, a first partial product PP0 may be input in FIG. 6A. Also, initial k bits of the previous sum SI may be input in FIG. 6A.

Figure 6B:
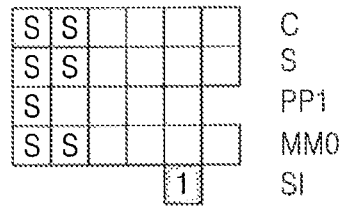
Figure 6C:
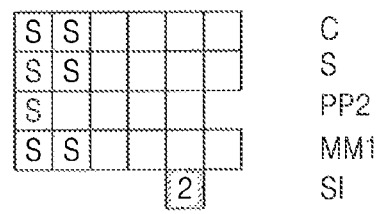
Figure 6D:
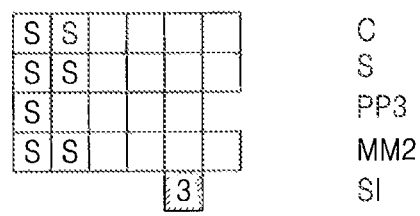

In FIGS. 6B through 6D, an accumulating/shifting operation can be repeatedly performed. As illustrated in FIGS. 6A through 6F, the previous sum SI may be input in units of k bits whenever the accumulating/shifting operation is performed.

Figure 6E:
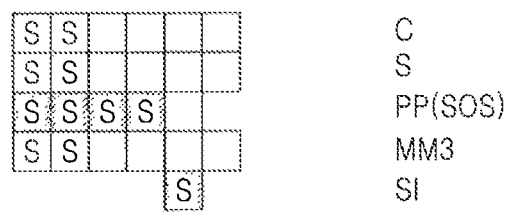
Figure 6F:

If the accumulating/shifting operation in FIG. 6E is the last to be performed, the partial product generation unit 410 may output the sign SOS of the previous sum SI as the partial product PP. In this case, the partial product generation unit 410 may extend and output the sign SOS of the previous sum SI. When the accumulating/shifting operation is performed in FIG. 6E so as to obtain the carry C and the sum S as illustrated in FIG. 6F, the sign SOS of the previous sum SI may be extended and input and thus the previous sum SI having the same length as other inputs may be input. Accordingly, in this manner, the Montgomery multiplier 300 may process the previous sum SI in units of k bits and may reflect the sign SOS of the previous sum SI in an accumulation stage.

The Montgomery multiplier 300 may reflect the sign SOS of the previous sum SI in a carry propagation adding stage. In this case, the CPA circuit 330 of the Montgomery multiplier 300 may additionally receive the sign SOS of the previous sum SI as well as the carry C and the sum S.

Figure 7:
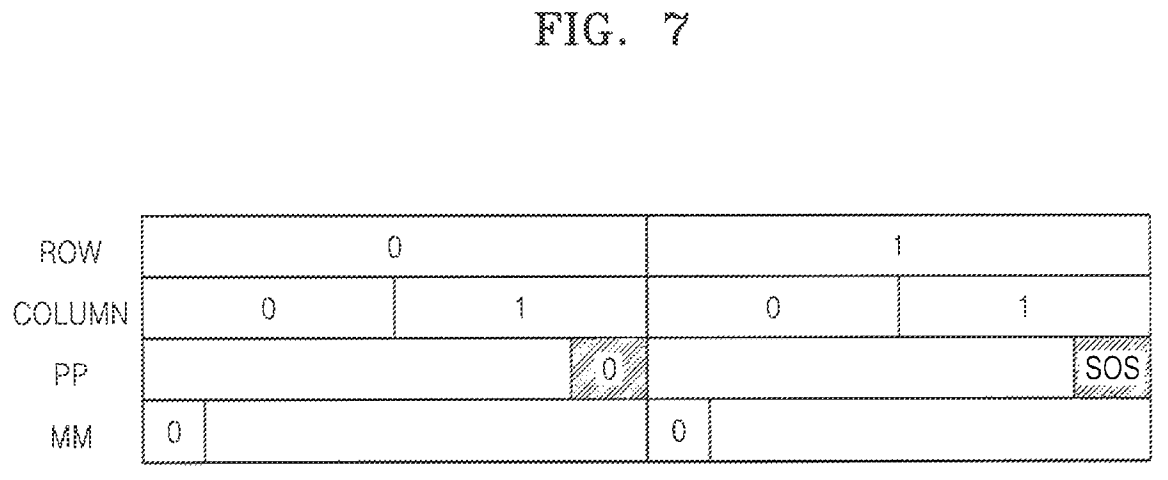

FIG. 7 is a diagram illustrating a point of time to process a sign SOS of a previous sum SI when the Montgomery multiplier 300 illustrated in FIG. 3 operates using double precision, according to exemplary embodiments of the present general inventive concept.

As described above in relation to FIGS. 6A through 6F, in the Montgomery multiplier 300, the partial product generation unit 410 may output the sign SOS of the previous sum SI instead of a value 0 as a partial product PP at a last clock of a row ROW. That is, as illustrated in FIG. 7, when the row ROW has a value 1, the sign SOS of the previous sum SI may be output as the partial product PP at the last clock. As described above in relation to FIGS. 6A through 6F, the sign SOS of the previous sum SI may be an extended sign.

As the previous sum SI may be generated in a previous accumulation stage, when the row ROW has a value 0, the previous sum SI may have a value 0 and the sign SOS of the previous sum SI may also have a value 0. Accordingly, as illustrated in FIG. 7, when the row ROW has a value 0, the partial product PP may have a value 0 at the lost clock.

Figure 8:
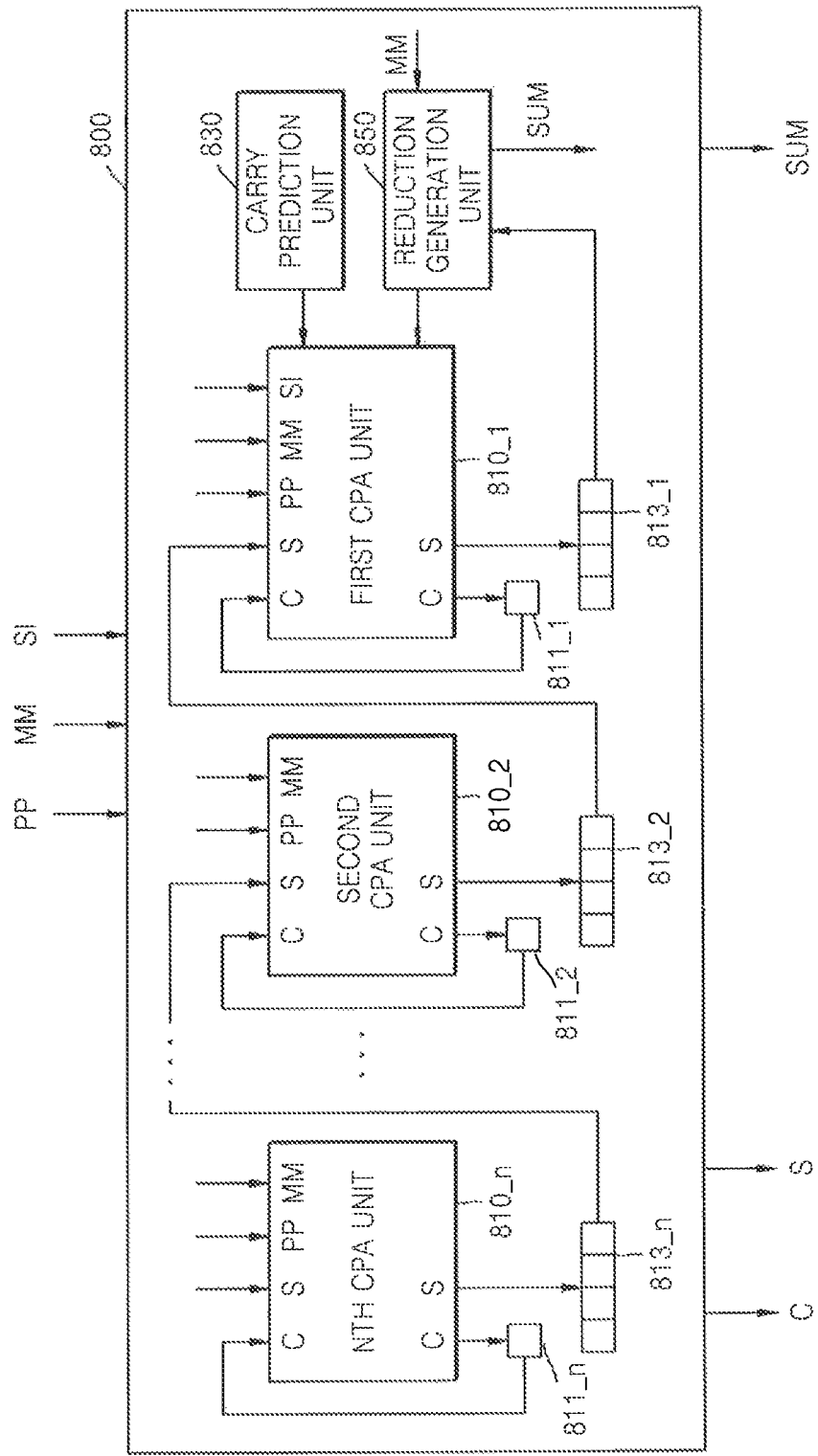
FIG. 8 illustrates a block diagram of an accumulator circuit included in the Montgomery multiplier illustrated in FIG. 3, according to exemplary embodiments of the present general inventive concept.

FIG. 8 is a block diagram of an accumulator circuit 800 included in the Montgomery multiplier 300 illustrated in FIG. 3, according to exemplary embodiments of the present general inventive concept. The accumulator circuit 800 may correspond to the accumulator circuit 320 illustrated in FIG. 3.

Referring to FIG. 8, the accumulator circuit 800 may include first through $n^{th}$ CPA units 810_1 through 810_$n$, a carry prediction unit 830 and a reduction generation unit 850. The accumulator circuit 800 may further include first through $n^{th}$ carry registers 811_1 through 811_$n$ for respectively saving carries C output from the first through $n^{th}$ CPA units 810_1 through 810_$n$, and first through $n^{th}$ sum registers 813_1 through 813_$n$ for respectively saving sums S output from the first through $n^{th}$ CPA units 810_1 through 810_$n$. The accumulator circuit 800 may be an integrated circuit, a programmable logic array, a field programmable gate array, a processor, an application specific integrated circuit, or any other suitable apparatus to carry out the exemplary embodiments of the present general inventive concept as disclosed herein.

Each of the first through $n^{th}$ CPA units 810_1 through 810_$n$ may receive a carry C, a sum S, a partial product PP and a multiple modulus MM. The first CPA unit 810_1 may further receive a previous sum SI.

In the accumulator circuit 800, it can be assumed that k in radix-$2^k$ has a value 4, and each of the sum S, the partial product PP, and the multiple modulus MM input to the first through $n^{th}$ CPA units 810_1 through 810_$n$ and the previous sum SI input to the first CPA unit 810_1 may have 4 bits. In this case, the partial product PP and the multiple modulus MM input to the accumulator circuit 800 may have 4×n bits and the previous sum SI output from the previous sum generation unit 430 and input to the accumulator circuit 800 may have 4 bits. When each of the first through $n^{th}$ CPA units 810_1 through 810_$n$ outputs a carry C and a sum S in a CPA type, the carry C output from each of the first through $n^{th}$ CPA units 810_1 through 810_$n$ may have 1 bit.

FIG. 8 exemplarily illustrates the accumulator circuit 800 to be included in a radix-16 ($2^k$, k=4) Montgomery multiplier. However, the Montgomery multiplier 300 may perform a Montgomery multiplication algorithm with respect to various values of k and various radices (e.g., where k=2 for a radix-4 multiplier, where k=6 for a radix-64 multiplier, where k=8 for a radix-256 multiplier, etc.). As such, the first through $n^{th}$ CPA units 810_1 through 810_$n$ of the accumulator circuit 800 may have various bit-widths (e.g., 1 bit, 2 bits, 4 bits, 6 bits, 8 bits, etc.).

The first CPA unit 810_1 may sum the received carry C, the sum S, the partial product PP, the multiple modulus MM and the previous sum SI and may output a carry C and a sum S in a CPA type. As described above, the sum S, the partial product PP, the multiple modulus MM and the previous sum SI input to the first CPA unit 810_1 may have 4 bits, and the carry C input to the first CPA unit 810_1 may have 1 bit. The second through $n^{th}$ CPA units 810_2 through 810_$n$ may operate similarly to the first CPA unit 810_1.

To increase calculation accuracy, the $n^{th}$ CPA unit 810_$n$, that is, a top CPA unit from among the first through $n^{th}$ CPA units 810_1 through 810_$n$, may use a sign-extended value with respect to each input.

As illustrated in FIG. 8, the first through $n^{th}$ CPA units 810_1 through 810_$n$ may be arranged in the form of a chain, and the sum S output from the second CPA unit 810_2 may be input to the first CPA unit 810_1. Accordingly, whenever the accumulator circuit 800 performs an accumulating/shifting operation, the sum S output at a previous clock can be shifted by 4 bits at a subsequent clock so as to be input to the first through $n^{th}$ CPA units 810_1 through 810_$n$.

The accumulator circuit 800 can receive 4 bits of the previous sum SI at every clock, can repeatedly perform an accumulating/shifting operation, and thus may sum all bits of the previous sum SI.

As illustrated in FIG. 8, the accumulator circuit 800 may divide input data into k bits, and each of the first through $n^{th}$ CPA units 810_1 through 810_$n$ may sum k bits so as to output the summed result in a CPA type. Accordingly, the first through $n^{th}$ CPA units 810_1 through 810_$n$ may respectively include the first through $n^{th}$ carry registers 811_1 through 811_$n$ having a size of 1 bit and the first through $n^{th}$ sum registers 813_1 through 813_$n$ having a size of k bits. As such, the accumulator circuit 800 may reduce the size of the first through $n^{th}$ carry registers 811_1 through 811_$n$ into 1/k of the size of the accumulator circuit 500 illustrated in FIG. 5.

Accordingly, as the accumulator circuit 800 may reduce the size the first through $n^{th}$ carry registers 811_1 through 811_$n$, an increase of a gate count according to an increase of a radix may be minimized and thus a high radix Montgomery multiplication algorithm may be realized.

The number of inputs of the first CPA unit 810_1 may be greater that those of the second through $n^{th}$ CPA units 810_2 through 810_$n$ due to the previous sum SI. Accordingly, a critical path may include the first CPA unit 810_1. Thus, if each of the second through $n^{th}$ CPA units 810_2 through 810_$n$ other than the first CPA unit 810_1 has a size equal to or smaller than k bits, the critical path of the accumulator circuit 800 may not disappear from the first CPA unit 810_1. When each of the second through $n^{th}$ CPA units 810_2 through 810_$n$ other than the first CPA unit 810_1 has a size larger than k bits, although the critical path is increased, the size of the second through $n^{th}$ carry registers 811_2 through 811_$n$ may be reduced and thus a gate count may be reduced.

The carry prediction unit 830 may predict a carry of the reduction generation unit 850 in order to reduce a delay caused by the reduction generation unit 850. The reduction generation unit 850 may receive the sum S from the first CPA unit 810_1. The reduction generation unit 850 may generate and output a reduction value SUM having k bits in a CPA type, according to the received sum S. The carry prediction unit 830 and the reduction generation unit 850 can be included in the accumulator circuit 800, which have structures and operations well-known to one of ordinary skill in the art, and thus will not be described in detail here.

Figure 9:
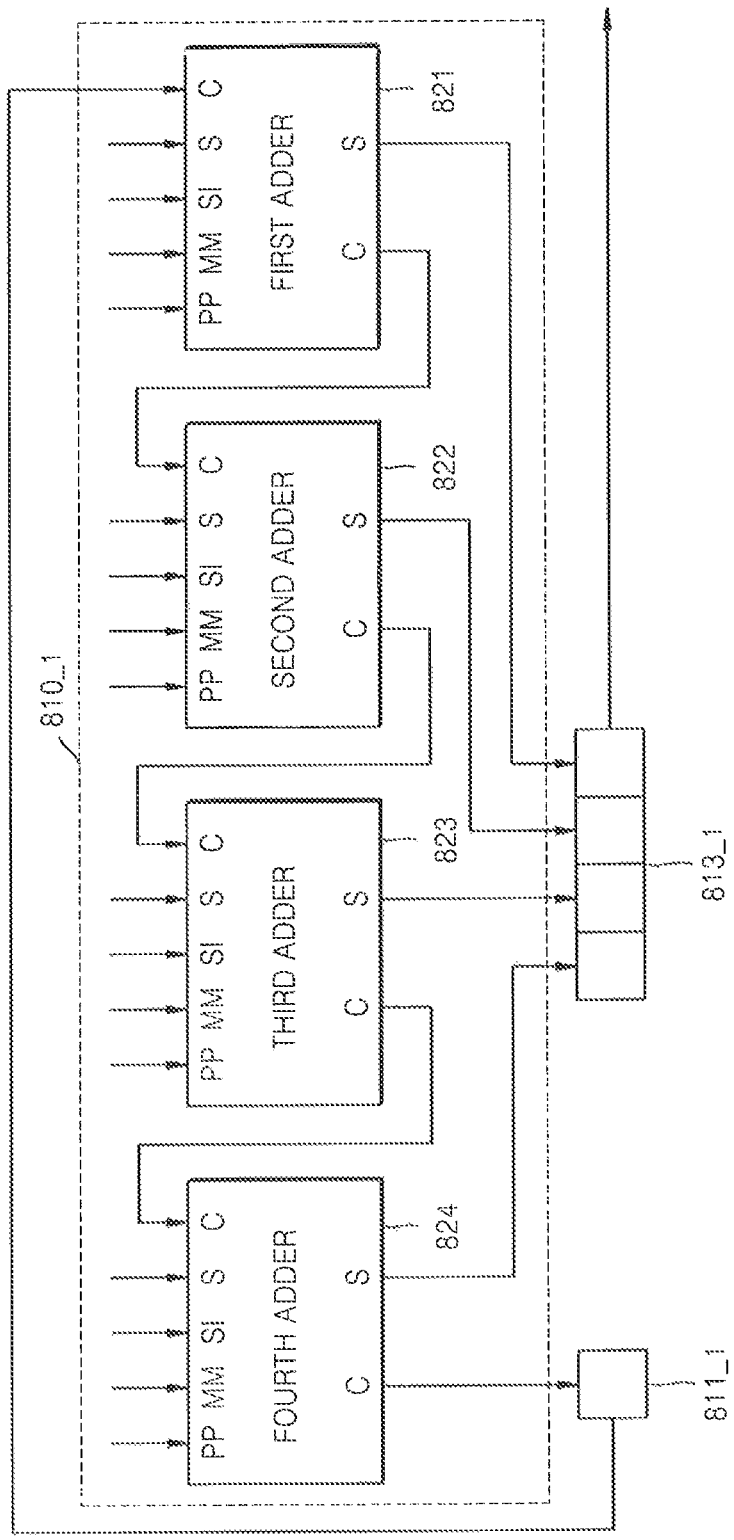
FIG. 9 is a block diagram illustrating a first carry propagation adder (CPA) unit illustrated in FIG. 8, according to exemplary embodiments of the present general inventive concept.

FIG. 9 is a block diagram of the first CPA unit 810_1 illustrated in FIG. 8, according to exemplary embodiments of the present general inventive concept. Referring to FIG. 9, the first CPA unit 810_1 may include first through fourth adders 821 through 824. Although FIG. 9 illustrates four adders on the assumption that k has a value 4, the number of adders to be included in the first CPA unit 810_1 may be variously changed according to the value of k.

The first CPA unit 810_1 may receive a 4-bit sum S from the second sum register 813_2, and receive a 4-bit partial product PP, a 4-bit multiple modulus MM and a 4-bit previous sum SI from the input coefficient generation unit 310 as illustrated in FIG. 3. As illustrated in FIG. 9, the 4 bits of the sum S, the partial product PP, the multiple modulus MM and the previous sum SI may be correspondingly input to the first through fourth adders 821 through 824.

Each of the first through fourth adders 821 through 824 may sum input data and may generate a carry C and a sum S. The carries S generated by the first through third adders 821 through 823 may be respectively output to the second through fourth adders 822 through 824. The carry C generated by the fourth adder 824 may be output to the first adder 821 via the first carry register 811_1. The sums S generated by the first through fourth adders 821 through 824 may be output to the first sum register 813_1.

As the carries C generated by the first through third adders 821 through 823 other than the fourth adder 824 are output to subsequent adders, the first CPA unit 810_1 may respectively output the carry C and the sums S ultimately generated in a CPA type, to the first carry register 811_1 and the first sum register 813_1. Accordingly, the first CPA unit 810_1 does not require additional registers for saving the carries C output from the first through third adders 821 through 823 and thus the size of a carry register may be reduced into ¼ as described above in relation to FIG. 8.

The carry C saved in the first carry register 811_1 may be output to the first adder 821 at a subsequent clock, and the sum S saved in the first sum register 813_1 may be output to the reduction generation unit 850 at the subsequent clock.

The second through $n^{th}$ CPA units 810_2 through 810_n illustrated in FIG. 8 can have similar structures and operations to those of the first CPA unit 810_1 as illustrated and described in FIG. 9, and thus will not be described in detail here.

Figure 10:
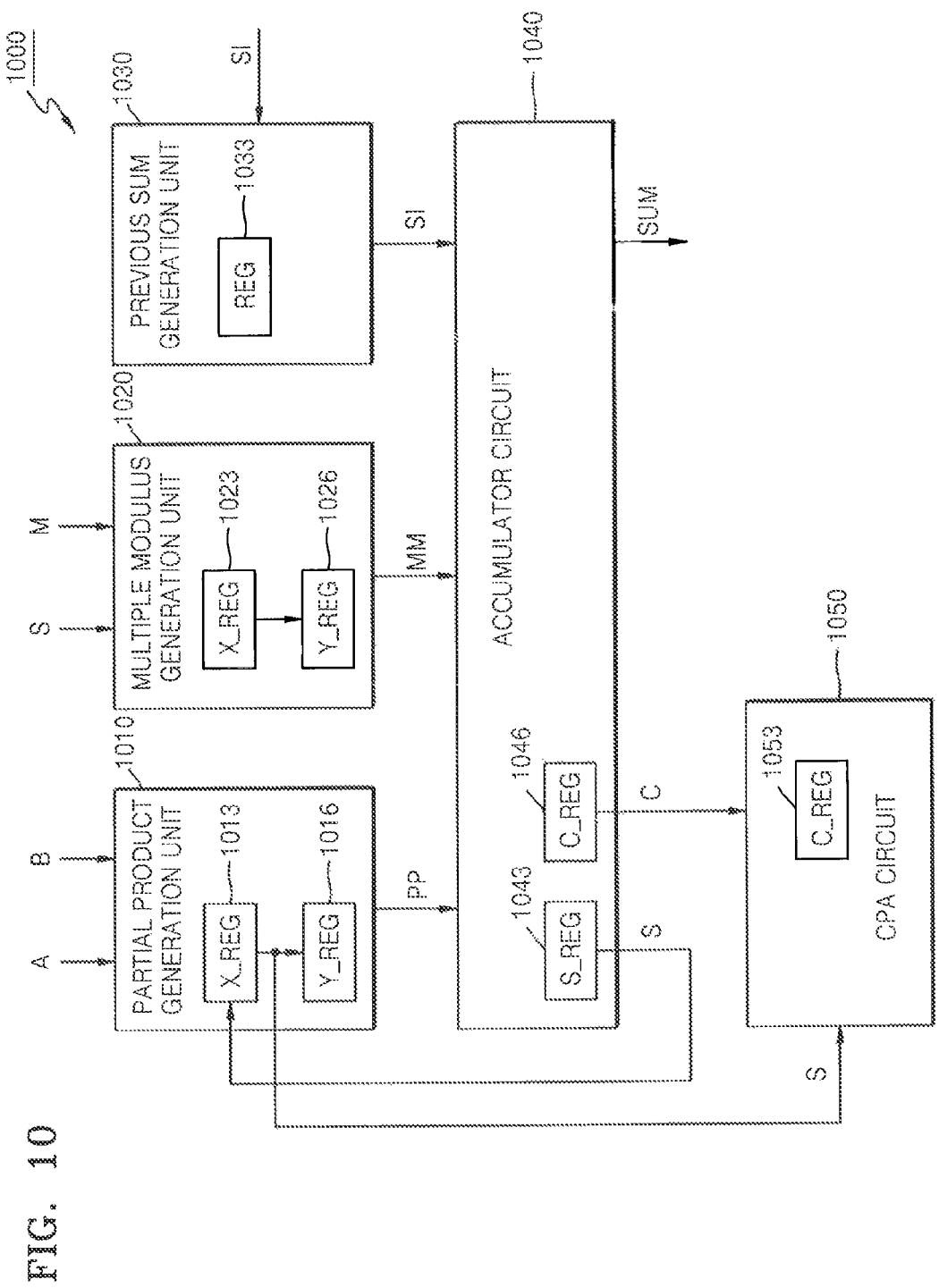
FIG. 10 illustrates a block diagram of a Montgomery multiplier including registers, according to exemplary embodiments of the present general inventive concept.

FIG. 10 is a block diagram of a Montgomery multiplier 1000 including registers, according to exemplary embodiments of the present general inventive concept. Referring to FIG. 10, the Montgomery multiplier 1000 may include a partial product generation unit 1010, a multiple modulus generation unit 1020, a previous sum generation unit 1030, an accumulator circuit 1040 and a CPA circuit 1050. The Montgomery multiplier 1000 may correspond to the Montgomery multiplier 300 illustrated in FIG. 3.

As illustrated in FIG. 10, the partial product generation unit 1010 may include an X register 1013 and a Y register 1016, and the multiple modulus generation unit 1020 may include an X register 1023 and a Y register 1026. The previous sum generation unit 1030 may include a register 1033 that may, for example, store a previous sum (SI), which may be received by the previous sum generation unit 1030 and provided to an accumulator circuit 1040.

The partial product generation unit 1010 and the multiple modulus generation unit 1020 may respectively output a partial product PP and a multiple modulus MM to be used in a column COLUMN currently calculated, and may respectively load a multiplier A and a modulus M to be used in a column COLUMN subsequently calculated, from an external storage device such as memory so as to respectively save the multiplier A and the modulus M in the X registers 1013 and 1023.

As illustrated in FIG. 10, in the Montgomery multiplier 1000, a sum S output from the accumulator circuit 1040 may be saved in the X register 1013 of the partial product generation unit 1010 and then may be output to the CPA circuit 1050 from the X register 1013, instead of being directly output to the CPA circuit 1050. As such, the CPA circuit 1050 does not require an additional register for saving the sum S.

CPA circuit 1050 may include a C register 1053 to store a carry value C (e.g., a carry value C received from the C register 1046 of the accumulator circuit 1040). A sum may be stored in the S register 1043 of the accumulator circuit 1040, and may be provided to the X register 1013 of the partial product generation unit 1010.

As the X register 1013 of the partial product generation unit 1010 may load the multiplier A, the Montgomery multiplier 1000 may be scheduled in order to output the sum S output from the accumulator circuit 1040, to the X register 1013 of the partial product generation unit 1010. A scheduling method will be described below with reference to FIGS. 11A and 11B.

FIGS. 11A and 11B illustrate a method of loading a multiplier A and a modulus M in the Montgomery multiplier 1000 illustrated in FIG. 10, according to exemplary embodiments of the present general inventive concept.

FIG. 11A illustrates loading of the multiplier A and the modulus M when a row ROW has a value 1 and a column COLUMN has a value 0. The multiplier A and the modulus M may be respectively represented as {A3, A2, A1, A0} and {M3, M2, M1, M0}. The multiplier A and the modulus M to be loaded when the row ROW has a value 1 and the column COLUMN has a value 0 may be used in a subsequent column calculation, that is, when the row ROW has a value 1 and the column COLUMN has a value 1.

As illustrated in FIG. 11A, the Montgomery multiplier 1000 may initially load M0, M1, M2 and M3 in the X register 1023 of the multiple modulus generation unit 1020, and then may load A0, A1, A2 and A3 in the X register 1013 of the partial product generation unit 1010. As such, while the modulus M is loaded, a sum S output from the accumulator circuit 1040 may be saved in the X register 1013 of the partial product generation unit 1010.

The sum S output from the accumulator circuit 1040 may be saved in the X register 1013 as an input of the partial product generation unit 1010, and then may be output to the CPA circuit 1050. That is, the CPA circuit 1050 may use the X register 1013 of the partial product generation unit 1010 to save the sum S output from the accumulator circuit 1040, and thus a register to save the sum S in the CPA circuit 1050 may not be included.

When the modulus M is loaded in the X register 1023 of the multiple modulus generation unit 1020, the CPA circuit 1050 may perform a carry propagation adding stage by using the X register 1013 of the partial product generation unit 1010. Accordingly, in the Montgomery multiplier 1000, the CPA circuit 1050 may perform a carry propagation adding stage when the accumulator circuit 1040 performs an accumulation stage. Accordingly, as illustrated in FIG. 11A, the Montgomery multiplier 100 may include a carry propagation adding stage in an accumulation stage.

FIG. 11B illustrates accumulation stages and carry propagation adding stages of the Montgomery multiplier 100 using double precision. As described above in relation to FIG. 11A, when the row ROW has a value 1 and the column COLUMN has a value 0, a carry propagation adding stage may be included in an accumulation stage. A last carry propagation adding stage may not be included in an accumulation stage.

Accordingly, as illustrated in FIG. 11B, the Montgomery multiplier 1000 may include carry propagation adding stages other than a last carry propagation adding stage, in accumulation stages. As such, the number of overall operation cycles may be reduced by the number of operation cycles of carry propagation adding stages included in accumulation stages.

Although FIGS. 11A and 11B exemplarily illustrate accumulation stages and carry propagation adding stages in a case when the Montgomery multiplier 1000 uses double precision, the Montgomery multiplier 1000 is not limited to double precision and may also use any of various types of multiple precision.

Although FIG. 11A exemplarily illustrates that the modulus M is initially loaded and then the multiplier A is loaded, alternatively, the multiplier A may be initially loaded and then the modulus M may be loaded. In this case, the sum S output from the accumulator circuit 1040 may be saved in the X register 1023 of the multiple modulus generation unit 1020. That is, the CPA circuit 1050 may also use the X register 1023 of the multiple modulus generation unit 1020.

Figure 12:
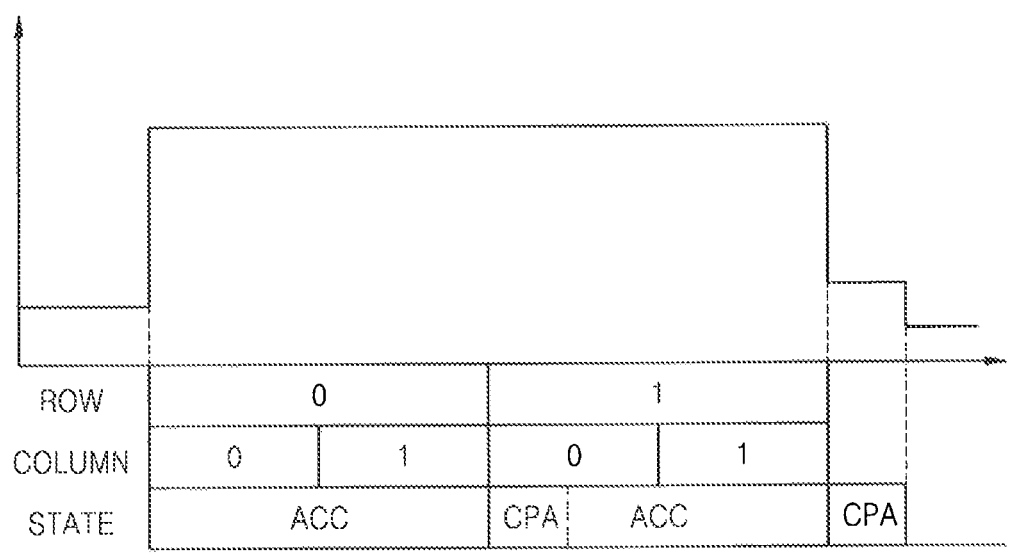
FIG. 12 is a graph illustrating a power curve of a Montgomery multiplier, according to exemplary embodiments of the present general inventive concept.

FIG. 12 is a graph illustrating a power curve of a Montgomery multiplier, according to exemplary embodiments of the present general inventive concept.

At least a portion of the power consumed by a conventional Montgomery multiplier can consumed in accumulation stages rather than in carry propagation adding stages. Also, the conventional Montgomery multiplier performs a carry propagation adding stage after performing an accumulation stage, and thus accumulation stages and carry propagation adding stages are identified from each other by using a power curve. Accordingly, an attacker may perform power analysis.

However, in a Montgomery multiplier according to exemplary embodiments of the present general inventive concept, carry propagation adding stages other than a last carry propagation adding stage can be included in accumulation stages as described above in relation to FIGS. 10, 11A and 11B, and thus a power curve can be obtained as illustrated in FIG. 12.

That is, the Montgomery multiplier according to exemplary embodiments of the present general inventive concept may have a constant power curve except for the last carry propagation adding stage and thus may be prepared for power analysis performed by an attacker.

The Montgomery multiplier according to exemplary embodiments of the present general inventive concept may be used in an encryption/decryption apparatus and a smart card, and may also be used in fields such as authentication using Rivest, Shamir and Adleman (RSA) and elliptic curve cryptography (ECC) algorithms, digital signatures, secure boot and network security. Here, the network security may include Internet protocol security (IPsec), a secure sockets layer (SSL) and transport layer security (TLS).

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although several embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A radix-$2^k$ Montgomery multiplier comprising:
    an input coefficient generation unit to receive a multiplier, a multiplicand, a modulus, a sum and a previous sum, to generate and to output a partial product and a multiple modulus by using at least one of the multiplier, the multiplicand, the modulus, and the sum, and to divide and to output the received previous sum into units of k bits;
    an accumulator circuit to receive the partial product, the multiple modulus and k bits of the previous sum from the input coefficient generation unit, and to generate and to output a carry and the sum by summing the partial product, the multiple modulus and the previous sum; and
    a carry propagation adder (CPA) circuit to generate and to output an ultimate sum by using the carry and the sum.

2. The Montgomery multiplier of claim 1, wherein the input coefficient generation unit comprises:
    a partial product generation unit to generate the partial product according to the multiplier and the multiplicand;
    a multiple modulus generation unit to generate the multiple modulus according to k lower bits of the sum and the modulus; and
    a previous sum generation unit to divide and to output the received previous sum into units of k bits.

3. The Montgomery multiplier of claim 1, wherein the accumulator circuit comprises: a plurality of adders,
    wherein each of the plurality of adders receives corresponding bits of the partial product and the multiple modulus,
    wherein each of adders corresponding to k lower bits from among the plurality of adders receives k bits of the previous sum, and
    wherein sums output from the plurality of adders are shifted by k bits so as to be input to the plurality of adders, and carries output from the plurality of adders are shifted by k−1 bits so as to be input to the plurality of adders.

4. The Montgomery multiplier of claim 1, wherein the accumulator circuit comprises:
    a plurality of CPA units,
    wherein each of the plurality of CPA units receives corresponding k bits of the partial product and the multiple modulus,
    wherein a first CPA unit receives k bits of the previous sum, and
    wherein a sum output from an $m^{th}$ CPA unit, with m being a natural number greater than or equal to 2, that is shifted and input to an (m−1)th CPA unit, and a carry output from the $m^{th}$ CPA unit is input to the $m^{th}$ CPA unit.

5. The Montgomery multiplier of claim 4, wherein the accumulator circuit further comprises:
    a plurality of carry registers corresponding to the plurality of CPA units; and
    a plurality of sum registers corresponding to the plurality of CPA units, and
    wherein each of the plurality of carry registers has a size of 1 bit, and each of the plurality of sum registers has a size of k bits.

6. The Montgomery multiplier of claim 1, wherein the input coefficient generation unit comprises:
    a plurality of registers to load and to save the multiplier and the modulus from an external device, wherein the sum generated by the accumulator circuit is output to the input coefficient generation unit and is stored in one of the plurality of registers.

7. The Montgomery multiplier of claim 6, wherein the input coefficient generation unit loads one of the multiplier and the modulus and loads the other of the multiplier and the modulus, and wherein, when the one of the multiplier and the modulus is loaded, the input coefficient generation unit saves the sum output from the accumulator circuit in at least one of the plurality of registers corresponding to the other of the multiplier and the modulus.

8. A radix-$2^k$ Montgomery multiplier comprising:

an input coefficient generation unit to receive a multiplier, a multiplicand, a modulus and a sum, and to generate and to output a partial product and a multiple modulus by using at least one of the multiplier, the multiplicand, the modulus and the sum;

an accumulator circuit to receive the partial product and the multiple modulus from the input coefficient generation unit, and to output a carry to a carry propagation adder and the sum to the input coefficient generation unit and to generate the carry and the sum by summing the partial product and the multiple modulus; and the carry propagation adder (CPA) circuit to generate and to output an ultimate sum by using the carry from the accumulator circuit and the sum from the input coefficient generation unit.

9. The Montgomery multiplier of claim 8, wherein the accumulator circuit comprises:

a plurality of CPA units, wherein each of the plurality of CPA units receives corresponding k bits of the partial product and the multiple modulus, wherein a sum output from an $m^{th}$ CPA unit, with m being a natural number that is greater than or equal to 2, is shifted and input to an (m−1)th CPA unit, and a carry output from the $m^{th}$ CPA unit is input to the $m^{th}$ CPA unit, and wherein each of the plurality of CPA units generates a 1-bit carry and a k-bit sum by summing received data.

10. The Montgomery multiplier of claim 9, wherein the accumulator circuit further comprises:

a plurality of carry registers corresponding to the plurality of CPA units; and a plurality of sum registers corresponding to the plurality of CPA units, and wherein each of the plurality of carry registers has a size of 1 bit, and each of the plurality of sum registers has a size of k bits.

11. A method of operating a radix-$2^k$ Montgomery multiplier, the method comprising:

receiving a multiplier, a multiplicand, a modulus, a sum, and a previous sum with an input coefficient generation apparatus of the radix-$2^k$ Montgomery multiplier;

generating a partial product and a multiple modulus with at least one of the multiplier, the multiplicand, the modulus, and the sum with the input coefficient generation apparatus;

dividing the received previous sum into units of k bits with the input coefficient generation apparatus;

generating a carry and the sum by summing the partial product, the multiple modulus and the previous sum with an accumulator of the radix-$2^k$ Montgomery multiplier; and generating and outputting an ultimate sum by using the carry and the sum with a carry propagation adder (CPA) of the radix-$2^k$ Montgomery multiplier.

12. The method of claim 11, wherein the Montgomery multiplier loads the previous sum in the divided k bit units.

13. The method of claim 11, wherein the accumulator reflects the sign of the previous sum.

14. The method of claim 11, wherein the CPA receives the sum from the input coefficient generation apparatus instead of the accumulator.

15. A method of operating a radix-$2^k$ Montgomery multiplier, the method comprising:

receiving a multiplier, a multiplicand, a modulus, a sum, and a previous sum with an input coefficient generation apparatus of the radix-2k Montgomery multiplier;

generating a partial product and a multiple modulus by using at least one of the received multiplier, the multiplicand, the modulus and the sum with an input coefficient generation apparatus of the radix-$2^k$ Montgomery multiplier;

generating a carry and the sum by summing the partial product, the multiple modulus, and the previous sum with an accumulator of the radix-$2^k$ Montgomery multiplier; and generating and outputting an ultimate sum with a carry propagation adder (CPA) of the radix-$2^k$ Montgomery multiplier by using the carry from the accumulator and the sum from the input coefficient generation apparatus.

16. The method of claim 15, further comprising:

dividing the received previous sum into units of k bits with the input coefficient generation apparatus of the radix-$2^k$ Montgomery multiplier, wherein the Montgomery multiplier loads the previous sum in the divided k bit units.

17. The method of claim 15, wherein the accumulator reflects the sign of the previous sum.

18. The method of claim 15, wherein the CPA receives the sum from the input coefficient generation apparatus instead of the accumulator.

19. A radix-$2^k$ Montgomery multiplier comprising:

an input coefficient generation unit to generate a partial product from at least a received multiplier and a received multiplicand, to generate a multiple modulus, and to divide a received previous sum into units of k bits;

an accumulator to sum the partial product, the multiple modulus and the previous sum so as to generate a carry and a sum; and a carry propagation adder (CPA) to generate an ultimate sum by using the carry and the sum.

20. The radix-$2^k$ Montgomery multiplier of claim 19, wherein the accumulator is without a non-shift circuit.

* * * * *